United States Patent
Norouzi (10) Patent No.: US 12,351,302 B2
(45) Date of Patent: Jul. 8, 2025

(54) RECONFIGURING VERTICAL TAKEOFF AND LANDING AIRCRAFT

(71) Applicant: Ramin Norouzi, Tehran (IR)

(72) Inventor: Ramin Norouzi, Tehran (IR)

( * ) Notice: Subject to any disclaimer, the term of this patent is extended or adjusted under 35 U.S.C. 154(b) by 0 days.

(21) Appl. No.: 18/571,237

(22) PCT Filed: Jun. 20, 2021

(86) PCT No.: PCT/IB2021/055423
§ 371 (c)(1),
(2) Date: Dec. 17, 2023

(87) PCT Pub. No.: WO2022/269309
PCT Pub. Date: Dec. 29, 2022

(65) Prior Publication Data
US 2024/0190561 A1 Jun. 13, 2024

(51) Int. Cl.
*B64C 29/00* (2006.01)

(52) U.S. Cl.
CPC ................ *B64C 29/0016* (2013.01)

(58) Field of Classification Search
CPC .......... B64C 1/063; B64C 5/02; B64C 11/28; B64C 27/33; B64C 27/37; B64C 27/39; B64C 27/41; B64C 27/43; B64C 27/45; B64C 29/0008; B64C 29/0016; B64C 29/0033; B64C 29/0041; B64C 29/0058; B64C 29/0075; B64C 29/0083; B64C 29/0091; B64C 29/02; B64C 29/04; B64U 20/50; B64U 30/29; B64U 30/291; B64U 30/292; B64U 30/293; B64U 30/296; B64U 30/297

USPC ........................................... 244/17.23
See application file for complete search history.

(56) References Cited

U.S. PATENT DOCUMENTS

| | | | |
|---|---|---|---|
| 9,914,537 B2 * | 3/2018 | Wu | B64U 30/291 |
| 10,035,581 B2 * | 7/2018 | Wood | B64U 30/293 |
| 10,549,846 B2 * | 2/2020 | Deng | B64U 60/70 |
| 10,589,838 B1 * | 3/2020 | Suppes | B64C 29/0033 |
| 10,625,855 B2 * | 4/2020 | Deng | B64C 39/024 |
| 11,186,367 B2 * | 11/2021 | Suppes | B64C 29/0033 |
| 11,628,932 B2 * | 4/2023 | Seung | B64U 60/50 |
| | | | 244/17.23 |
| 11,702,202 B1 * | 7/2023 | Anderson | B64C 27/33 |
| | | | 244/17.23 |
| 11,919,629 B2 * | 3/2024 | Bartsch | B64U 30/12 |
| 12,105,533 B1 * | 10/2024 | De Paiva | B64D 27/24 |
| 12,202,593 B2 * | 1/2025 | Atsumi | A01D 34/52 |
| 2019/0061936 A1 * | 2/2019 | North | B64C 11/46 |
| 2019/0100303 A1 * | 4/2019 | Campbell | B64C 27/26 |
| 2020/0079501 A1 * | 3/2020 | Graves | B64C 9/00 |

(Continued)

FOREIGN PATENT DOCUMENTS

WO WO-2020193991 A1 * 10/2020 ............. B64D 27/24

*Primary Examiner* — Joshua E Rodden (57) ABSTRACT

The present disclosure relates to an autonomous, electric, vertical takeoff and landing (VTOL) aircraft that is low-noise, safe, and efficient to operate for cargo transportation over relatively long ranges. A VTOL aircraft includes a fuselage, a plurality of arms, a tail, and a plurality of propulsion systems mounted on the arms and the tail. The plurality of arms have parts that are rotatable and the tail has a part that is rotatable for transitioning the VTOL aircraft between a forward-flight configuration and a hover configuration.

12 Claims, 12 Drawing Sheets

(56) References Cited

U.S. PATENT DOCUMENTS

| | | | | |
|---|---|---|---|---|
| 2021/0078704 A1* | 3/2021 | Blakstad | ................. | B60L 50/66 |
| 2021/0206483 A1* | 7/2021 | Lee | .................... | B64C 29/0025 |
| 2021/0339294 A1* | 11/2021 | Melanson | .............. | B64U 10/13 |
| 2022/0250742 A1* | 8/2022 | Bower | ................... | B64D 27/31 |
| 2022/0402603 A1* | 12/2022 | Frank | ...................... | B64C 29/00 |
| 2023/0249817 A1* | 8/2023 | Groninga | ............... | B64D 31/14 |
| 2024/0092484 A1* | 3/2024 | Cho | ........................ | B64C 13/34 |
| 2024/0116629 A1* | 4/2024 | Storrs | .................... | B64C 11/32 |
| 2024/0190561 A1* | 6/2024 | Norouzi | ................. | B64U 10/16 |
| 2024/0217651 A1* | 7/2024 | Hesselbarth | ........ | B64C 29/0025 |

\* cited by examiner

Figure 12

RECONFIGURING VERTICAL TAKEOFF AND LANDING AIRCRAFT

BACKGROUND

Urban road transport accounts for a significant portion of air pollution in large cities. Moreover, the traffic congestion on urban road networks has increased substantially during the past decades which have resulted in more emissions. Aside from its adverse effect on the environment, such an increase in urban traffic load has prolonged the average commuting time at the city level. Hence, an urgent need has emerged for Urban Air Mobility (UAM) systems. Specifically, there is a rising demand for aircraft capable of point-to-point transportation of goods and cargo across cities.

Aircraft that require a runway to operate are obviously out of question for vast intra city exploitation between arbitrary locations such as retail stores and customers' residences. Therefore, Vertical takeoff and landing (VTOL) aircraft have been considered substantially for UAM applications. However, it is challenging to design efficient, safe, and practical VTOL aircraft which offer sustainable cargo transportation within urban and suburban areas. Among current VTOL designs, helicopters can carry heavy payloads over relatively long ranges, but they are too noisy due to their large rotor, are air polluting because of their considerable fossil fuel consumption, and are big enough to be incapable of takeoff and landing in dense urban areas except those with open fields and helipads.

On the other hand, electrically-powered VTOL aircraft are eco-friendly and generate less noise but have considerably low range even if they can accommodate heavy cargo weight. In addition to the range and weight related shortcomings of the conventional electrically-powered VTOL aircraft, they need to be designed to be autonomous to reduce operational expenses and lower the risks of flying in dense urban areas.

Hence, there is an unaddressed requirement in the prior art for an efficient, safe, and autonomous electrically-powered VTOL aircraft that not only can carry heavy cargo over relatively long ranges but can also operate between arbitrary geographical locations even in dense urban areas without their size limiting this exploitation.

BRIEF DESCRIPTION OF THE DRAWINGS

The disclosure will now be described solely by way of example and with reference to the accompanying drawings which are incorporated in and constitute a part of the specification, illustrate embodiments of the disclosure and, together with the description, serve to explain these embodiments. In the drawings.

Same reference numbers in the various drawings refer to same features. It should be noted that the features of the accompanying drawings are not meant to scale relative to each other, rather they are intended for clear illustration of the disclosure's principles. Also, where applicable, some or all features may not be illustrated to assist in the description of underlying features.

DETAILED DESCRIPTION

An autonomous, electric, vertical takeoff and landing (VTOL) aircraft in accordance with some embodiments of the present disclosure has multiple foldable arms with two or more propellers mounted on each arm. Such an arrangement provides propeller redundancy, which improves safety by maintaining adequate propulsion and control in case of a failure of one or more of the propellers. Moreover, in such an arrangement the required lifting force is distributed among the electrically-powered propellers allowing for lower blade speed and subsequently less generated noise.

Each arm is comprised of a fixed segment, a moving part, and a joint with at least one propeller mounted on the fixed segment and the same number of propellers positioned on the moving part such that the propellers of each corresponding propeller pair (i.e. one propeller on the fixed segment and another one on the moving part) are equally distanced from the joint.

Each aircraft arm is designed to fold as the aircraft transitions from a forward-flight configuration to a hover configuration, thereby rotating half of the propellers mounted on it. In this regard, for the forward-flight configuration, aircraft arms are fully extended. For the hover configuration, moving parts of the arms are pivoted horizontally about their corresponding joints and get aligned with their corresponding fixed segments such that each corresponding propeller pair forms a substantially coaxial propulsion system. This in-flight reconfiguration allows for more efficiency during the longest flight phase (i.e. forward-flight), and more compact aircraft size for takeoff and landing.

In some embodiments, the VTOL aircraft has a tilting tail configuration wherein the tail is comprised of a fixed part, a joint, and a rotating part configured to support wings and at least one propeller mounted on its end. The aircraft tail is designed to tilt as the aircraft transitions between a forward-flight configuration and a hover configuration. In this regard, for the forward-flight configuration, axes of the fixed and rotating parts of the tail are aligned substantially parallel to the flight path of the aircraft. With this arrangement, tail wings provide part of the required lift for counteracting the weight of the aircraft, and tail propellers provide forward thrust while their streamtube inflow simultaneously passing over parts of the tail wings so that the lift characteristics of the wings such as lift-to-drag ratio are improved. Moreover, turbulent high-speed wake of the tail propellers does not flow over the fuselage or any other parts of the aircraft, hence resulting in less drag.

In the forward-flight configuration, propellers of the arms act as lifting wings while the tail propellers provide forward thrust, thereby efficiently allowing the aircraft to remain substantially levelled during forward-flight as the lifting propellers (i.e. propellers of the arms) do not need to tilt to provide forward thrust. Such an arrangement enables the aircraft to achieve a relatively long range with a comparatively high cruising speed.

For the hover configuration, the rotating part of the tail, its aft mounted propellers, and the tail wings are tilted in order to position the aft propellers to provide upward thrust. The aft propellers contribution to the upward thrust compensates for the decrement in total aircraft lift force caused by tilt of the tail wings and reduction of thrust from the propellers of the arms due to their reconfiguration from single propellers into coaxial propellers in the hover configuration.

Therefore, using the configurations described herein, it is possible to design an autonomous, safe, low-noise, electric, VTOL aircraft capable of carrying cargo over a relatively long range. Moreover, an exemplary aircraft designed in accordance with this application can have an in-flight reconfiguration capability which enables it to takeoff and land in dense urban areas that do not have any special takeoff and landing platform or an open field.

Figure 1:
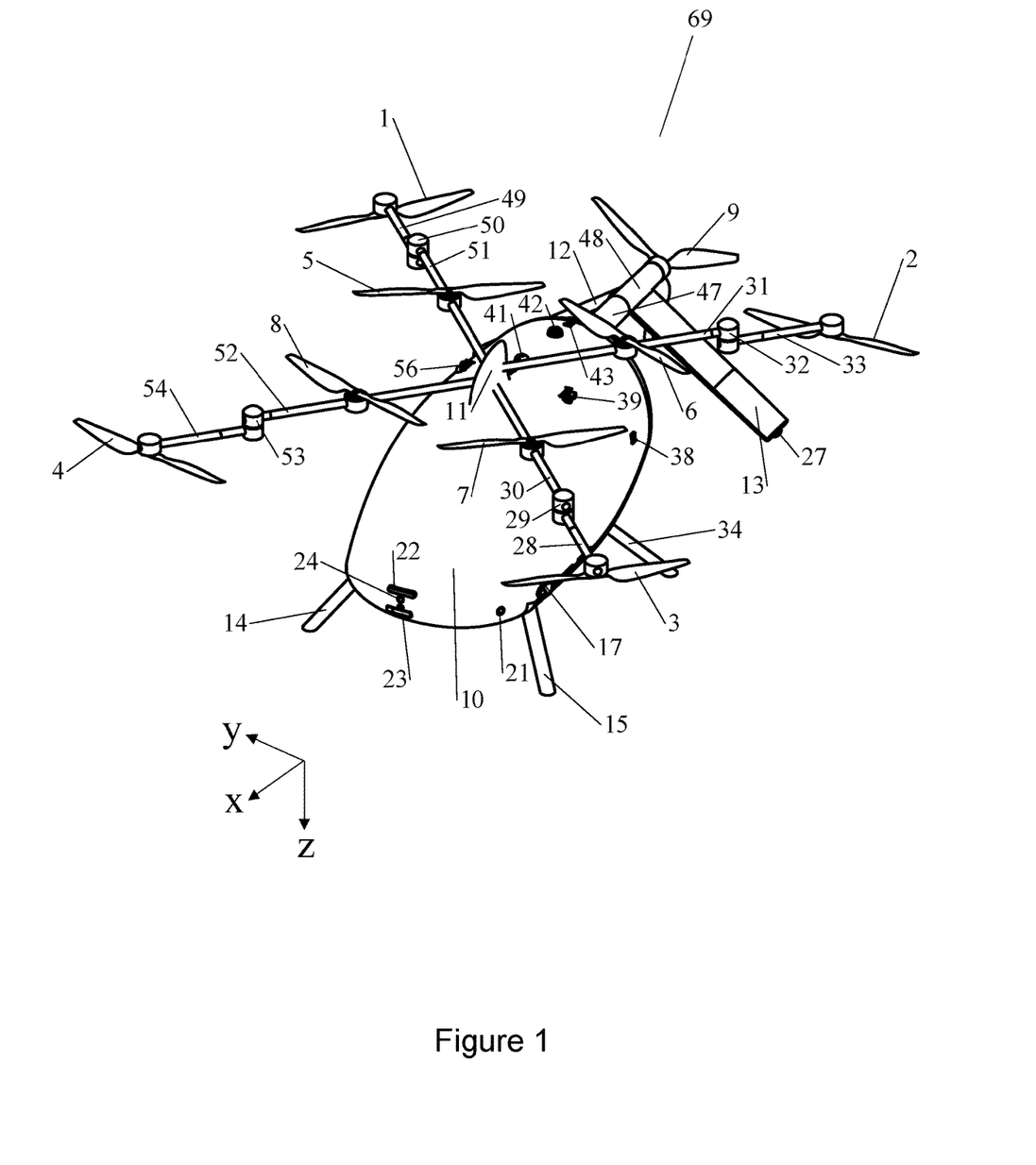
FIG. 1 depicts a perspective view of an autonomous, electric, VTOL aircraft in a forward-flight configuration in accordance with some embodiments of the present disclosure.

FIG. 1 depicts a VTOL aircraft 69 in accordance with some embodiments of the present disclosure. The aircraft 69 is electrically powered thereby helping to reduce environmental contamination, noise, and operational costs. All conventional means of providing electrical power are contemplated. Moreover, the aircraft 69 is autonomous or self-piloted. Hence, it is capable of carrying cargo to selected destinations, selecting appropriate and safe landing sites, avoid collision with obstacles and other flying aircraft, detecting and isolating failure in propulsion system or other aircraft systems, and implementing an emergency landing in case needed, all under the direction of a flight management system without the assistance and intervention of a human pilot. It should be noted that the terms "autonomous" and "self-piloted" are synonymous and may be used interchangeably.

A plurality of arms are coupled to the fuselage 10. In some embodiments, a total of four arms are coupled to the fuselage 10, as shown by FIG. 1, but other numbers of arms are possible in other embodiments. These arms may be coupled to the fuselage 10 through a shark fin protrusion 11 at top of the fuselage 10, as in the exemplary embodiment depicted by FIG. 1, but in other embodiments the arms may be coupled to the fuselage 10 through other means and at other points of the fuselage 10.

Each of the aforementioned four arms has one fixed segment, a joint, and a rotating part. Fixed segments 30, 31, 51, 52 are mounted on the fuselage 10 via the protrusion 11 on one end and connected to the joints 29, 32, 50, 53 on the other end, respectively. Rotating parts 28, 33, 49, 54 are connected to the joints 29, 32, 50, 53 on one end, and connected to the propellers 3, 2, 1, 4 on the other end, respectively.

It should be noted that each of the nine propellers 1-9 presented in the accompanying drawings of the present disclosure is coupled to a respective motor that drives the corresponding propeller. In some embodiments, these motors are brushless direct current (DC) motors, but other motor types are possible in other embodiments. These motors are not explicitly visible in the accompanying drawings of the present disclosure as each of them is surrounded by a respective cylindrical casing. It should be considered that these cylindrical motor casings are not numbered in the accompanying drawings but are clearly visible, and are apparent to those skilled in the art. Hence, wherever herein a propeller is referred to as being connected to a part, it means the propeller and its respective motor are connected to that part.

As shown by FIG. 1, in some embodiments, one propeller is mounted on the fixed segment of each arm such that its distance to that arm's joint is substantially the same as the distance between the other propeller at the end of the rotating part of that arm and that arm's joint. In this regard, propellers 7, 6, 5, 8 are mounted on fixed segments 30, 31, 51, 52, respectively, where in some embodiments, these propellers may be positioned in the middle of their corresponding fixed segments. Distances between axes of symmetry of cylindrical motor casings of propellers 7, 6, 5, 8, and axes of symmetry of cylindrical joints 29, 32, 50, 53 are substantially the same as the distances between axes of symmetry of cylindrical joints 29, 32, 50, 53, and axes of symmetry of cylindrical motor casings of propellers 3, 2, 1, 4, respectively.

Figure 3:
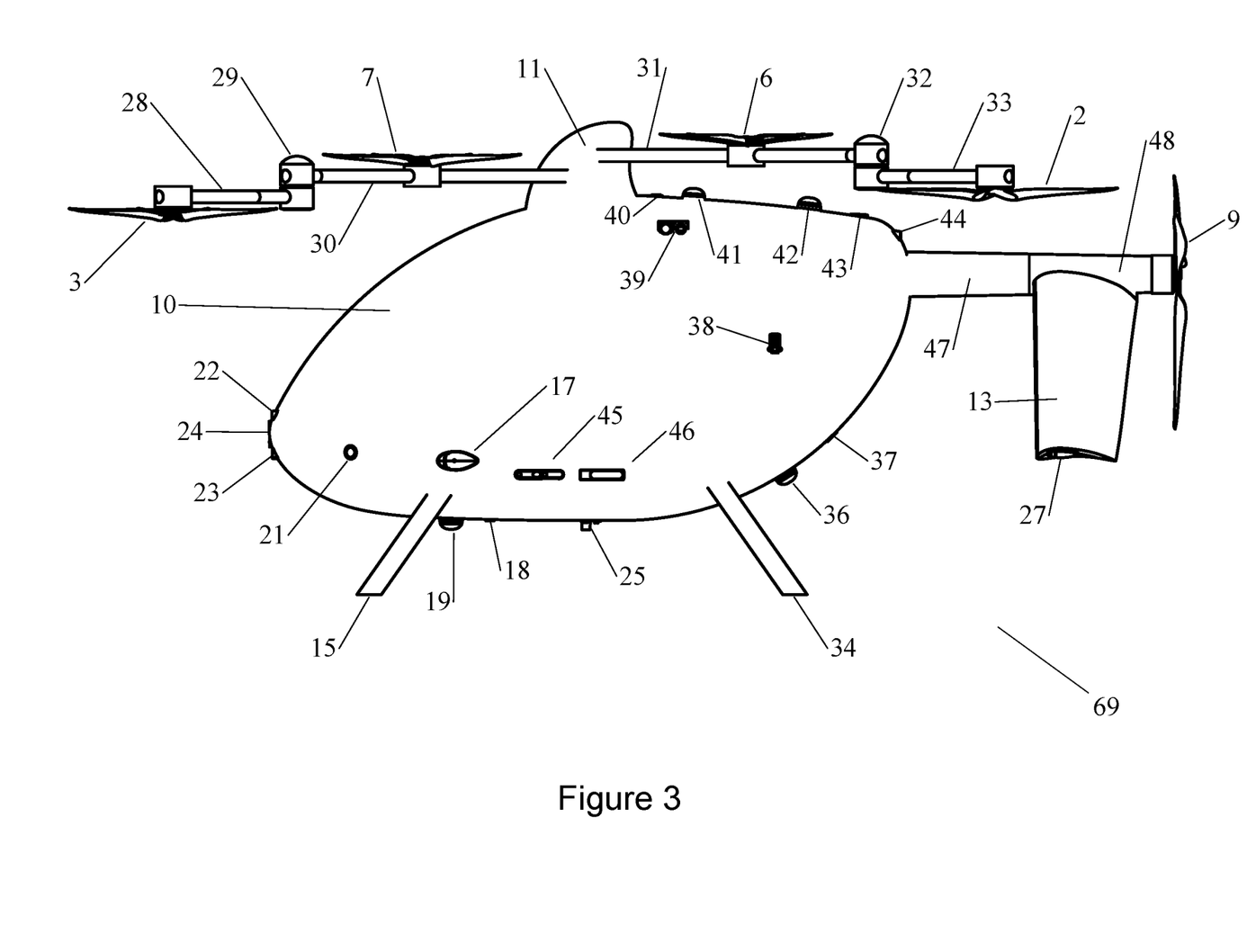
FIG. 3 depicts a side view of an autonomous, electric, VTOL aircraft, such as is depicted by FIG. 1.

Further, as can be seen in FIG. 1, and also in FIG. 3 which depicts the side view of the aircraft in accordance with some embodiments of the present disclosure, arm joints 29, 32, 50, 53 are designed such that on each joint, the connection point of the fixed segment and the connection point of the rotating part are vertically spaced from one another. Therefore, in each arm, the fixed segment and the rotating part are in parallel planes but not in the same horizontal plane (i.e. the rotating part moves in a horizontal plane that does not consist of the fixed segment). Also, each of the mentioned arm joints 29, 32, 50, 53 encompasses a rotary actuator within its cylindrical housing.

Figure 6:
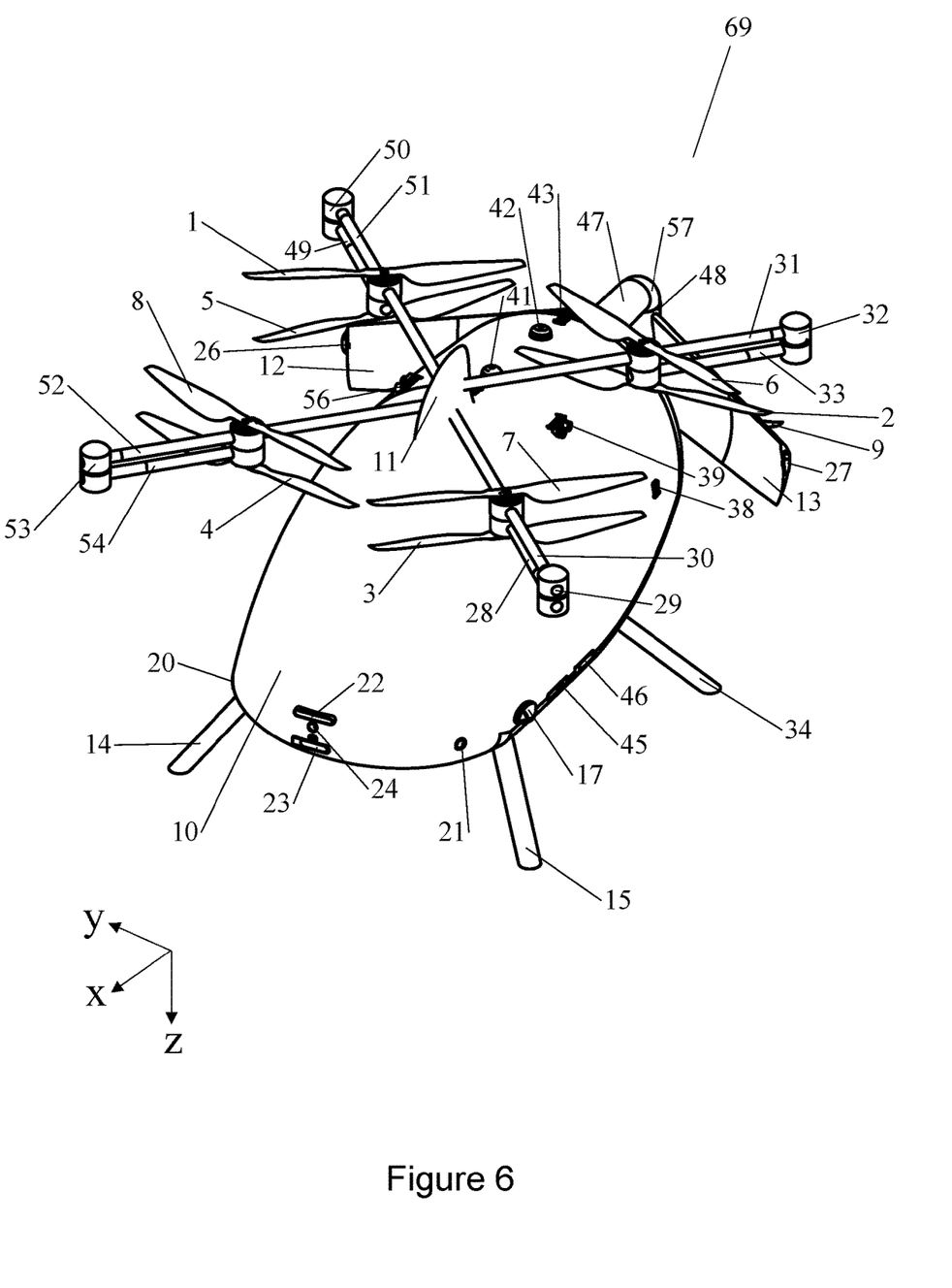
FIG. 6 depicts a perspective view of an autonomous, electric, VTOL aircraft, such as is depicted by FIG. 1, in a hover configuration in accordance with some embodiments of the present disclosure.

As depicted by FIG. 6, with the arrangement described above, each of the arms' rotating parts 28, 33, 49, 54 and their corresponding propellers 7, 6, 5, 8 can be pivoted by the respective rotary actuator with respect to the corresponding fixed segments 30, 31, 51, 52 such that each arm's fixed and rotating parts become aligned and the pair of propellers on each arm form a substantially coaxial propulsion system. In this regard, pair of propellers "3 and 7" forms a coaxial propulsion system, likewise, pairs of propellers "2 and 6", "5 and 1", "4 and 8" form coaxial propulsion systems.

Figure 2:
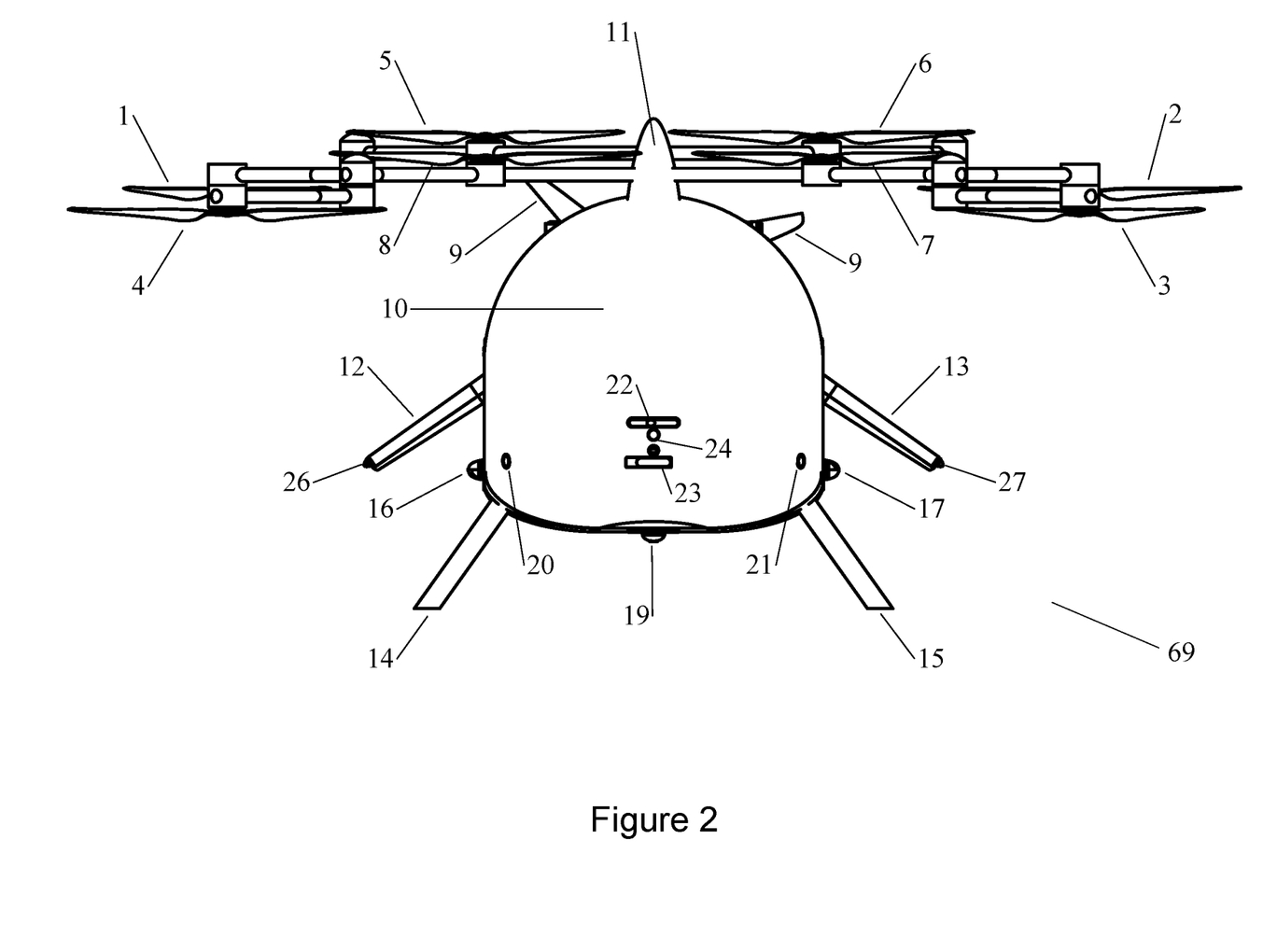
FIG. 2 depicts a front view of an autonomous, electric, VTOL aircraft, such as is depicted by FIG. 1.

As can be seen in FIGS. 1 and 3, and also in FIG. 2 which depicts the front view of the aircraft 69 in accordance with some embodiments of the present disclosure, the two arms inclined towards the front of the aircraft (i.e. arms comprised of components 30, 29, 28, and 52, 53, 54) may be mounted higher than the two arms inclined towards the rear of the aircraft (i.e. arms comprised of components 31, 32, 33, and 51, 50, 49) so as to keep the rear propellers 6, 2, 5, 1 out of the wake of the forward propellers 7, 3, 8, 4, respectively.

Figure 5:
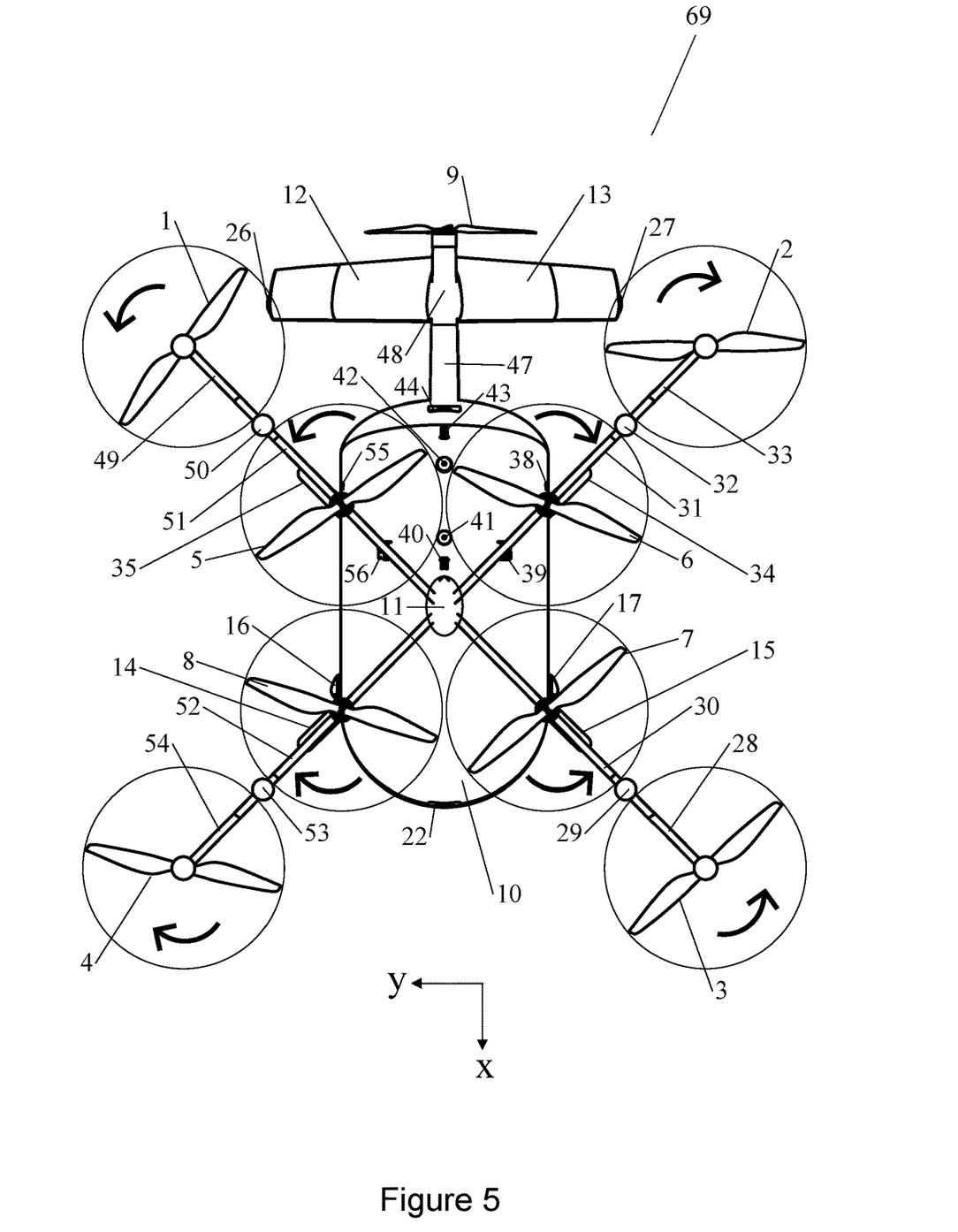
FIG. 5 depicts a top view of an autonomous, electric, VTOL aircraft, such as is depicted by FIG. 1, wherein directions of blade rotation of the propellers are shown.

As shown by FIGS. 1 and 3, and also by FIG. 5 which depicts the top view of the aircraft 69, in some embodiments, aircraft 69 has a tail comprised of a fixed part 47, a tilting part 48, a pair of wings 12, 13, a joint 57 (not shown) connecting the fixed part 47 to the tilting part 48, and a propeller 9 mounted on the aft of the tilting part 48. As can be seen in FIG. 3, the tail component 48 may be aligned with the fixed part 47 such that thrust generated by the propeller 9 is substantially horizontal (in the x-direction in FIG. 1), and the lift generated by the wings 12, 13 is substantially vertical (in the negative (−) z-direction in FIG. 1).

In some embodiments, wings 12, 13 are mounted on the tilting part 48 in an inverted V-tail configuration, as shown by FIGS. 1, 2 and 3, but other tail configurations are possible in other embodiments. The shown configuration combines the three stabilizing surfaces of a conventional tail configuration into two surfaces (i.e. features 12, 13) that from a distinct inverted V. With this arrangement, wings 12, 13 have less interference drag compared to the conventional tail configuration because of fewer tail-fuselage junctures. Wings 12, 13 may have a positive incidence angle with a cambered, high lift, low Reynolds number airfoil which generates considerable amount of lift in cruising speeds of the aircraft.

In some embodiments of the present disclosure, wings 12, 13 are not equipped with flight control surfaces at the trailing edge of the wings, whereas in other embodiments, wings 12, 13 may be designed to have control surfaces at their trailing edge where in that case, the functionality of a typical single rudder surface and two elevator surfaces is combined in two surfaces that are called ruddervators. The ruddervators are deflected in a manner that effectively recreates the functionality of the conventional rudder and elevator.

Figure 8:
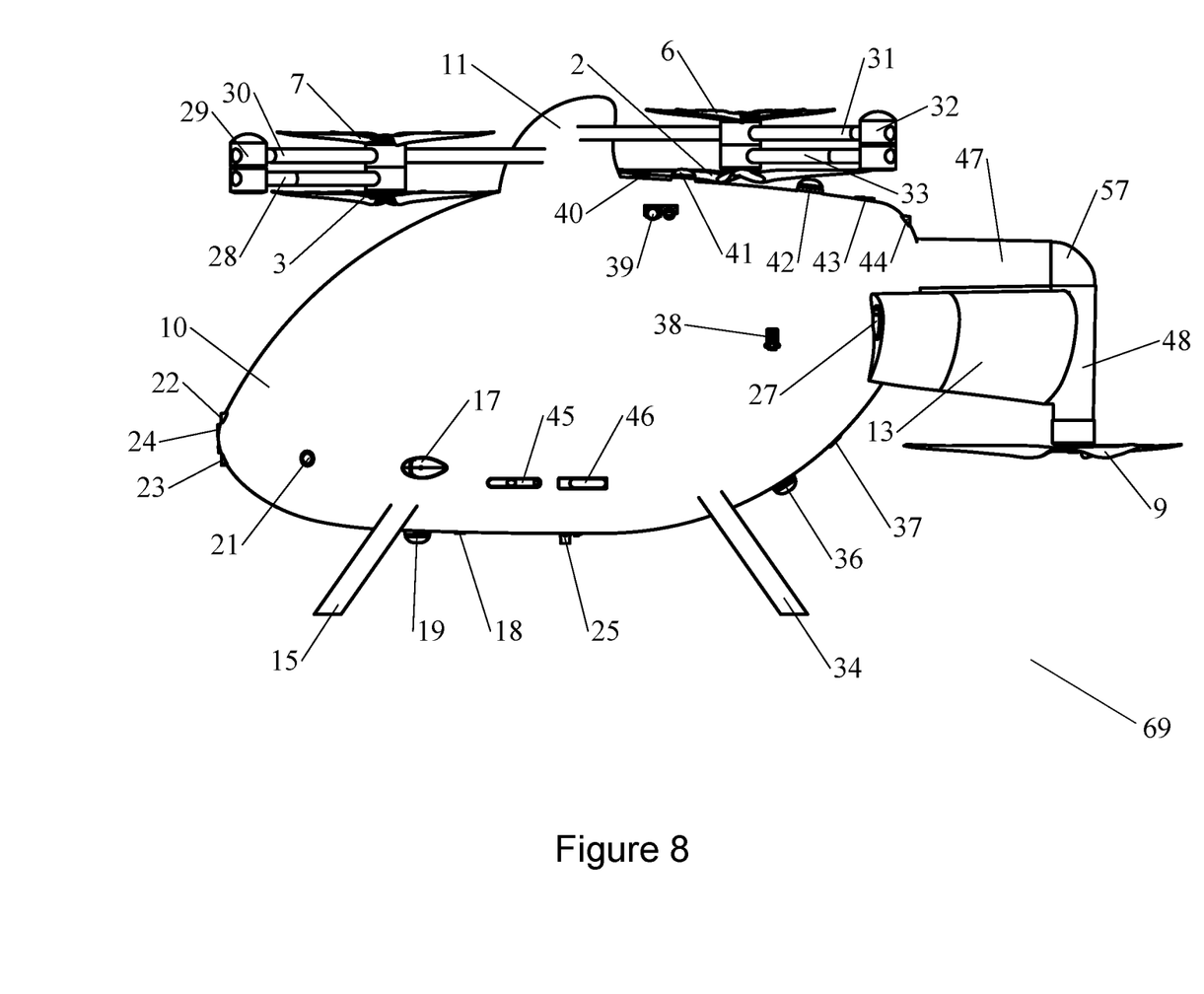
FIG. 8 depicts a side view of an autonomous, electric, VTOL aircraft, such as is depicted by FIG. 6.

In some embodiments, there is one propeller mounted on the aft of the tail, as shown by FIG. 8, but in other embodiments other forms of propulsion system may be used such as two contra-rotating propellers in a coaxial form or two propellers in a twin-engine form mounted on nacelles at the end of the tail.

As depicted by FIG. 8, the tilting part 48 and correspondingly propeller 9 and wings 12, 13 that are mounted on it can be pivoted by the respective rotary actuator within joint 57 with respect to the fixed segment 47 such that thrust generated by the propeller 9 becomes substantially vertical (in the negative (−) z-direction in FIG. 6).

Exploiting the reconfiguration capabilities of the arms and tail of the aircraft 69 as described so far, enables the transformation of the aircraft 69 between an extended state as depicted by FIG. 1 and a compacted state as shown by FIG. 6. The aircraft is in the compacted state while performing hover, takeoff, and landing, and is in the extended state while performing forward-flight.

Figure 7:
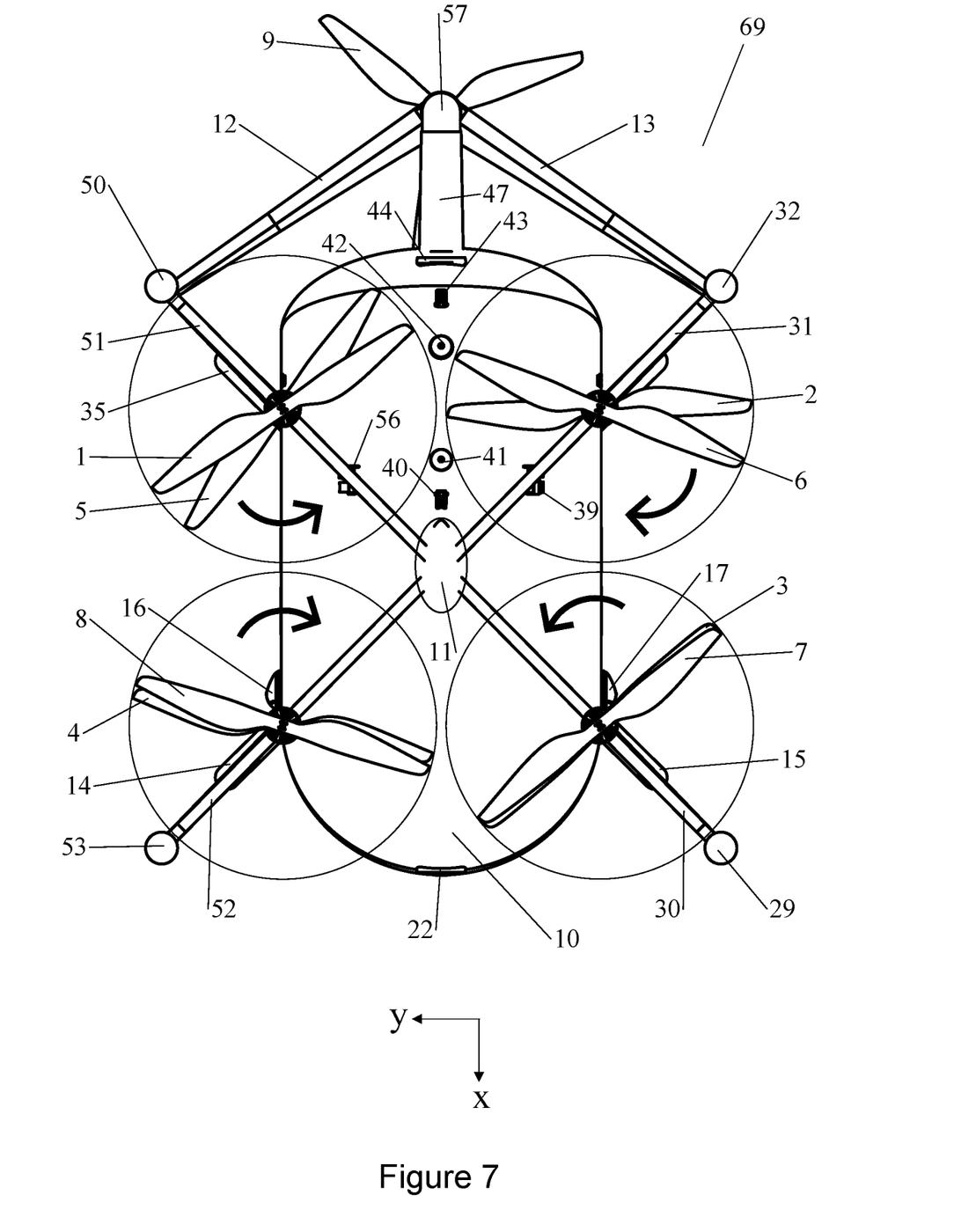
FIG. 7 depicts a top view of an autonomous, electric, VTOL aircraft, such as is depicted by FIG. 6, wherein directions of blade rotation of the propellers are shown.

As can be seen in FIG. 7, in some embodiments, the anhedral angle of the wings 12, 13 is chosen such that in the hover configuration (i.e. the compacted state) the wings 12, 13 surround the aft of the fuselage 10 but do not collide with any part of it. Hence, considerably reducing the length of the aircraft 69 for takeoff and landing comparing to the forward-flight configuration (i.e. the extended state), as can be seen by comparing FIGS. 3 and 5 with FIGS. 8 and 7, respectively.

Further, comparing FIGS. 1, 3, 5 with FIGS. 6, 8, 7 respectively, shows how effectively the aircraft 69 can be compacted and how considerably its size can be reduced by folding its four arms as per previous descriptions (i.e. by rotating arm components 28, 33, 49, 54).

In some embodiments, the cylindrical motor casings of the respective propellers that form coaxial propulsion systems in the hover configuration may comprise mating features such as magnets to lock the attaching surfaces of the motor casings of the respective propellers together in the hover configuration, and prevent the surfaces from possible momentary separations during probable arms vibrations. In this regard, as depicted by FIG. 6, in the hover configuration, cylindrical motor casings of propellers 3 and 7 may be locked together, similarly, motor casings of propellers 2 and 6, motor casings of propellers 5 and 1, and motor casings of propellers 4 and 8 may be locked together.

As depicted by FIG. 1, the four aircraft arms may be positioned symmetrically with respect to the fuselage 10 longitudinal plane of symmetry (formed by x and z body axes). With this arrangement, the aerodynamic center of the lifting system formed by the propellers 1-8 (i.e. thrust from the propellers 1-8 resembles lift from the main wings of an aircraft) falls substantially on the intersection point of the two imaginary lines (not shown in FIG. 1) that connect the endpoints of the arms 30, 31, 51, 52 that are inside the protrusion 11. This imaginary intersection point is inside the protrusion 11.

The center of gravity of the aircraft 69 is between the protrusion 11 and the wings 12, 13 such that moments generated by lift from the wings 12, 13 counteract the moments generated by thrust from the propellers 1-8 in the forward-flight configuration. Thus, the aircraft 69 is able to achieve pitch stability without the need for a horizontal stabilizer that would otherwise generate lift in a downward direction, thereby inefficiently counteracting the thrust generated by the propellers 1-8.

As can be seen in FIGS. 6 and 8, the wings 12, 13 have no lift (in the negative (−) z-direction in FIG. 6) in the hover configuration as they are tilted by the rotating tail component 48. Hence, in the hover configuration, the center of gravity of the aircraft 69 is between the protrusion 11 and the propeller 9 such that moments generated by thrust from the propeller 9 counteract the moments generated by thrust from the propellers 1-8, thus enabling the aircraft to achieve pitch stability. As described earlier, aggregated thrust from the propellers 1-8 formed into four coaxial propulsion systems in the hover configuration is less than aggregated thrust from the same propellers performing as eight single rotors in the forward-flight configuration. This difference in aggregated thrust from the propellers 1-8 and lack of lift from the wings 12, 13 in the hover configuration may be offset for by thrust from the propeller 9.

The direction of rotation of the propeller blades, is referred to as "blade direction" herein. In some embodiments, the blade directions of the outer propellers 1, 4, and the inner propellers 5, 8 on one side of the fuselage 10 mirror the blade directions of the outer propellers 2, 3, and the inner propellers 6, 7 on the other side of the fuselage 10, respectively. That is, the outer propeller 1 corresponds to the outer propeller 3 and has the same blade direction. Further, the outer propeller 2 corresponds to the outer propeller 4 and has the same blade direction. Similarly, the inner propeller 5 corresponds to the inner propeller 7 and has the same blade direction, and the inner propeller 6 corresponds to the outer propeller 8 and has the same blade direction.

Also, the blade direction of the corresponding outer propellers 2, 4 is opposite to the blade direction of the corresponding outer propellers 1, 3, and the blade direction of the corresponding inner propellers 6, 8 is opposite to the blade direction of the corresponding inner propellers 5, 7. Further, in some embodiments, the blade directions of the propellers on the same diagonal may be selected to be the same. That is, the blade directions of the propellers 1, 5, 7, 3 are the same, and the blade directions of the propellers 2, 6, 8, 4 are the same.

Thus, the outer propellers 1, 2, 4, 3 which in some embodiments are in a pusher configuration as depicted by FIG. 1, are arranged in a mirrored quad formation having a pair of diagonally-opposed propellers 1, 3 that rotate their blades in the same direction and a pair of diagonally-opposed propellers 2, 4 that rotate their blades in the same direction. Similarly, the inner propellers 5, 6, 8, 7 which in some embodiments are in a tractor configuration as depicted by FIG. 1, are arranged in a mirrored quad formation having a pair of diagonally-opposed propellers 5, 7 that rotate their blades in the same direction and a pair of diagonally-opposed propellers 6, 8 that rotate their blades in the same direction.

As depicted by FIG. 5, in some embodiments, the aircraft arms form an X-shaped frame such that the propellers 1, 5, 7, 3 are diagonally aligned and also the propellers 2, 6, 8, 4 are diagonally aligned. Further, as shown by FIG. 5, in some embodiments, the propellers 1, 5, 7, 3 that are positioned on the principal diagonal (i.e. the diagonal from the top left to bottom right when viewed from the top of the aircraft 69) are selected to have a counter-clockwise blade direction, and the other four propellers 2, 6, 8, 4 that are positioned on the counter diagonal (i.e. the diagonal from the bottom left to top right when viewed from the top of the aircraft 69) are selected to have a clockwise blade direction.

With the above arrangements, propellers that form a coaxial propulsion system have the same blade direction hence forming a co-rotating coaxial propulsion system, as can be seen by comparing FIGS. 5 and 7.

With the propeller positioning and blade direction arrangements described above, aircraft 69 controllability can be attained. In this regard, corresponding propellers may generate moments that counteract each other, thereby enabling to trim the aircraft 69 as desired. Also, the blade rotation speeds of the propeller 1-8 may be controlled accordingly to attain the intended yaw, pitch, and roll moments. For instance, considering the embodiment shown by FIG. 5, the blade rotation speeds of the propellers 1, 5, 7, 3 may be decreased by the same amount, while the blade rotation speeds of the propellers 2, 6, 8, 4 are increased by the same amount. This will lead to zero moments both in the forward-and-backward and in the leftward-and-rightward directions. Owing to Newton's Third Law, every action has an equal and opposite torque reaction. Hence, the counter-clockwise yaw moment is increased because the blade rotation speeds of the propellers 2, 6, 8, 4 are increased in the clockwise direction. On the other hand, the clockwise yaw moment of the aircraft 69 is decreased because the blade rotation speeds of propellers 1, 5, 7, 3 are decreased in the counter-clockwise direction. Finally, this results in a counter-clockwise yaw moment (yaw in the negative (−) z direction in FIG. 1) of the aircraft 69. With the above arrangements, aircraft 69 can yaw without being displaced about the roll axis or the pitch axis, unlike conventional aircraft where using control surfaces on wings to generate yawing moment will also cause the aircraft to roll. This is an important design advantage of the presented disclosure as it enables carrying special cargo that need to be remained in a levelled position throughout the flight. The above description holds also for the hover configuration. In other words, with the above arrangements, the aircraft 69 can yaw in the forward-flight and the hover configurations as desired without rolling or pitching of the fuselage 10.

Figure 9:
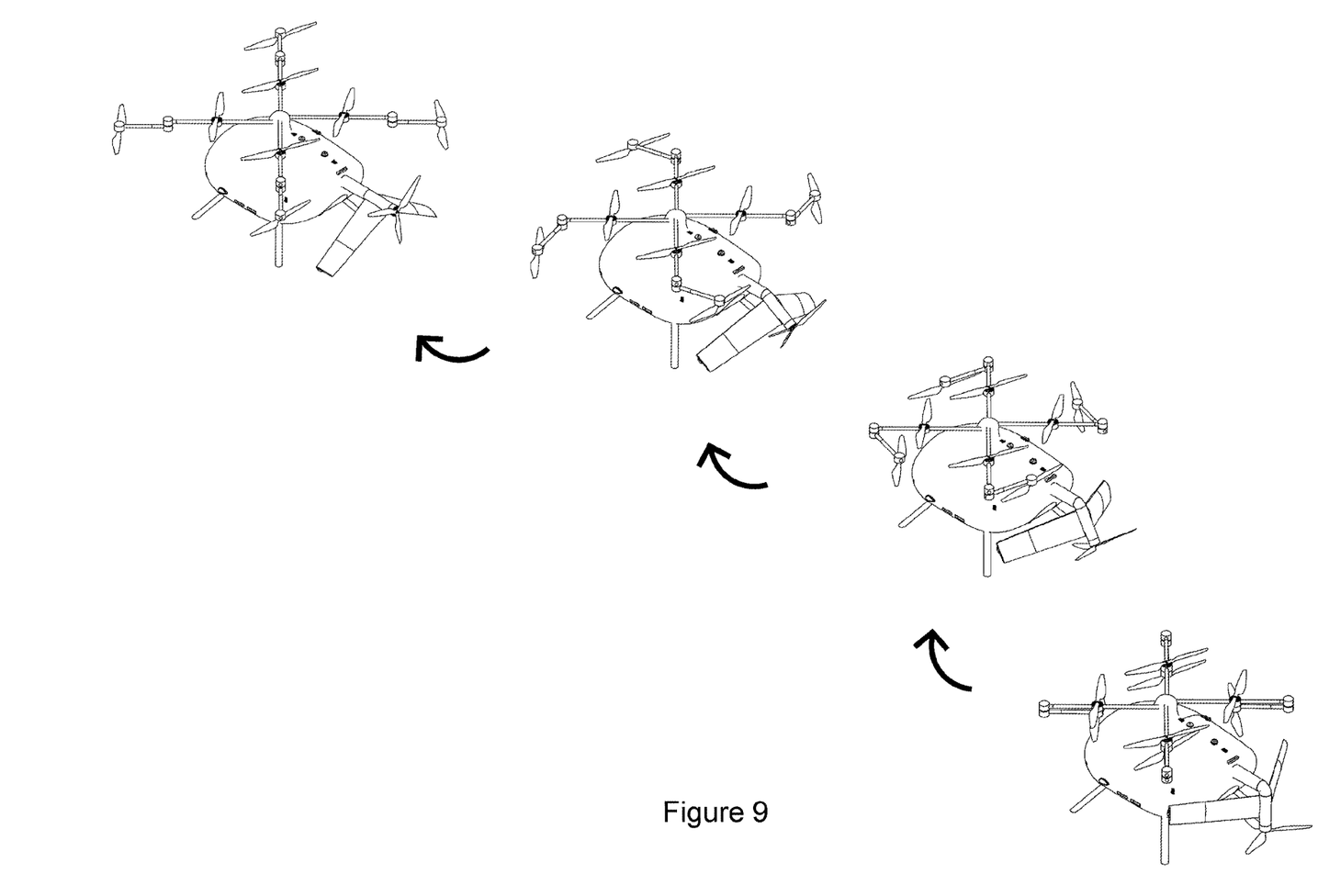
FIG. 9 depicts a perspective view of an autonomous, electric, VTOL aircraft, such as is depicted by FIG. 1, taking off and transitioning from a hover configuration to a forward-flight configuration in accordance with some embodiments of the present disclosure.

FIG. 9 depicts the reconfiguration of the aircraft 69 from the hover configuration to the forward-flight configuration as specified by the arrows. The aircraft 69 would reconfigure from the forward-flight configuration to the hover configuration in the reversed order.

In case of a failure of any of the propellers 1-8, the fault tolerant flight controller 61 (shown by FIG. 10) may adjust the blade rotation speeds of the propellers that remain operational to compensate for the failed propeller whilst maintaining the aircraft 69 maneuverability and controllability. Further, the controller 61 may selectively change the rotation degree of any of the rotating parts 28, 33, 49, 54, 48 to a degree other than those of the forward-flight configuration (extended state) and the hover configuration (compacted state).

Figure 10:
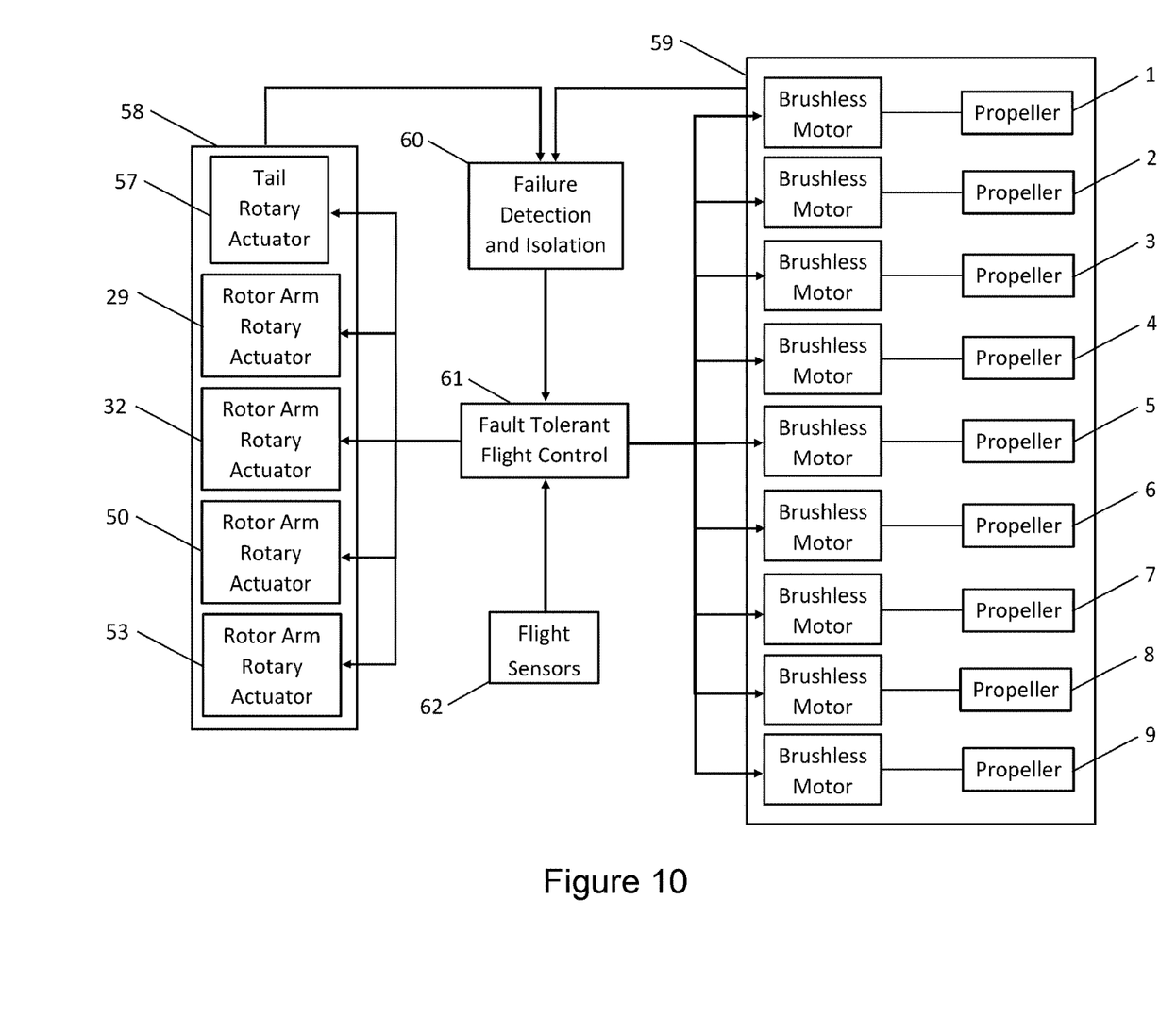
FIG. 10 is a block diagram illustrating a number of main components of an autonomous, electric, VTOL aircraft, such as is depicted by FIG. 1, in accordance with some embodiments of the present disclosure.

As depicted by FIG. 10, the aircraft 69 may be equipped with a group of flight sensors 62 that input data into the controller 61. In some embodiments, these plurality of sensors may include stereo depth cameras 18, 22, 44, 45, ultrasonic sensors 20, 21, 37, solid-state LiDAR sensors 24, 25, 39, 56, combined Time-of-Flight and ultrasonic sensors 38, 40, 43, 55 and tracking cameras 23, 46, as depicted by FIGS. 1-5, but other sensors and sensors combinations may be used in other embodiments.

Figure 11:
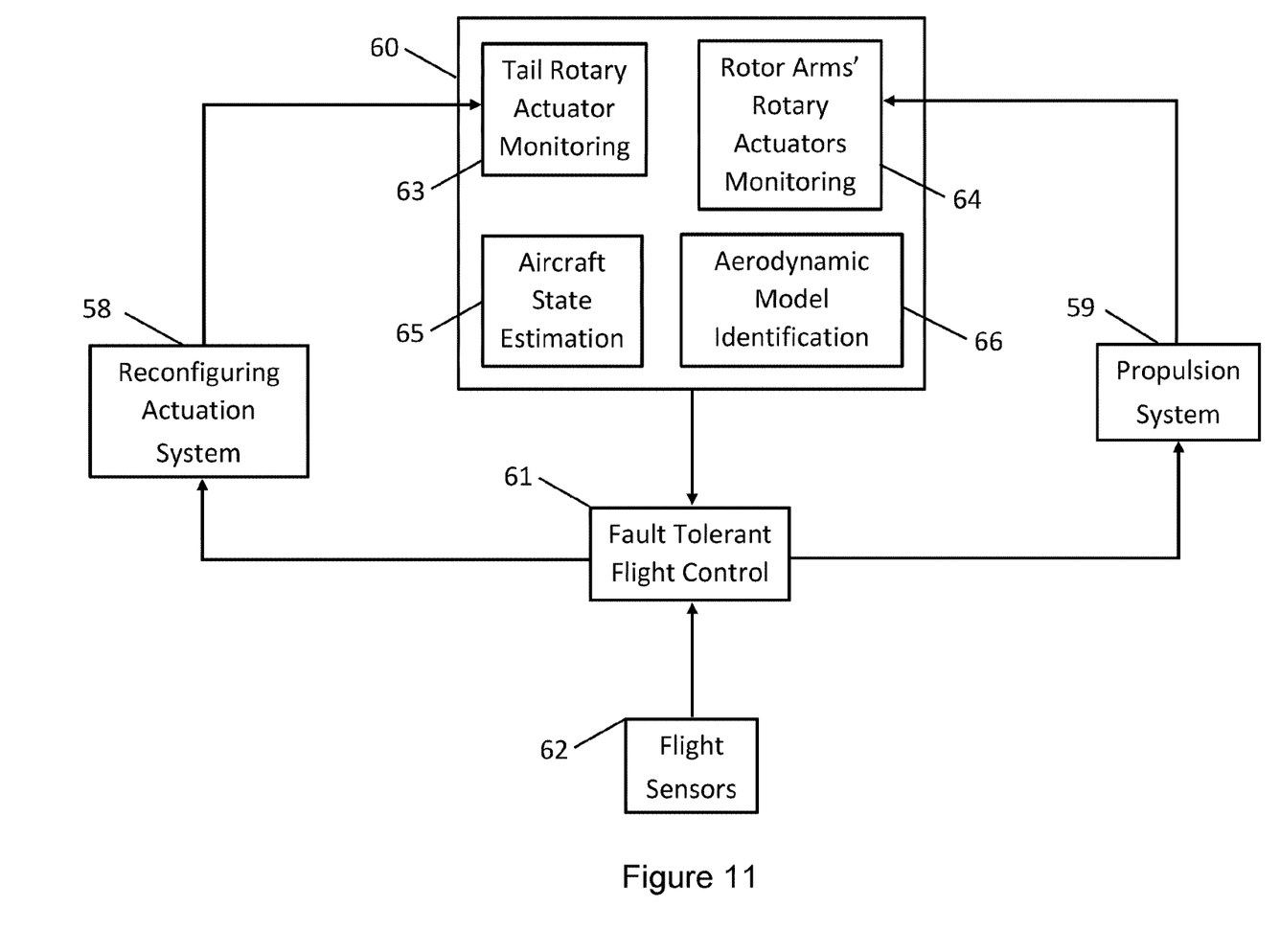
FIG. 11 is an alternative representation of the block diagram depicted by FIG. 10, illustrating components of a failure detection and isolation system, such as is depicted by FIG. 10, in accordance with some embodiments of the present disclosure.

The aircraft 69 may also be equipped with a failure detection and isolation system 60, as depicted by FIGS. 10 and 11, that may be comprised of two monitoring units 63 and 64 overseeing the performances of the propeller 1-9 and their corresponding motors and rotary actuators of the arms and the tail, an aircraft state estimation unit 65, and an aerodynamic model identification unit 66. In this regard, the failure detection and isolation system 60 receives input from the propulsion system 59 and the reconfiguration actuation system 58 which includes the arms and tail actuators 29, 32, 50, 53, 57, as depicted by FIGS. 10 and 11. The failure detection and isolation system 60 processes the received data to detect any failure in the propellers 1-9 or other aircraft systems and to evaluate the altered aircraft dynamic parameters due the failure. Then it sends the processed data to the controller 61. Based on the received data from the failure detection and isolation system 60, various input data from the aforementioned group of sensors 62, and the mission and flight plan of the aircraft 69, the controller 61 sends corresponding control commands to the respective motors of the propellers 1-9 and the arms and tail actuators.

In some embodiments, the failure detection and isolation system 60 is equipped with a machine-learning-based flight envelope estimation unit which evaluates the impaired aircraft maneuvering flight envelope boundaries and limitations substantially in real-time.

The controller 61 is capable of providing the necessary control commands to the units 58 and 59 so that the aircraft 69 avoids collision with moving and stationary obstacles by performing fast altitude and/or attitude change while holding the fuselage 10 level with respect to the horizontal plane.

In some embodiments, the controller 61 may adjust the blade rotation speeds of the propellers 1-8 to compensate for the reaction torque of the propeller 9 and/or any lift and drag unbalance between the wings 12 and 13 caused by the asymmetric streamtube inflow of the propeller 9 passing over the wings 12, 13.

Figure 12:
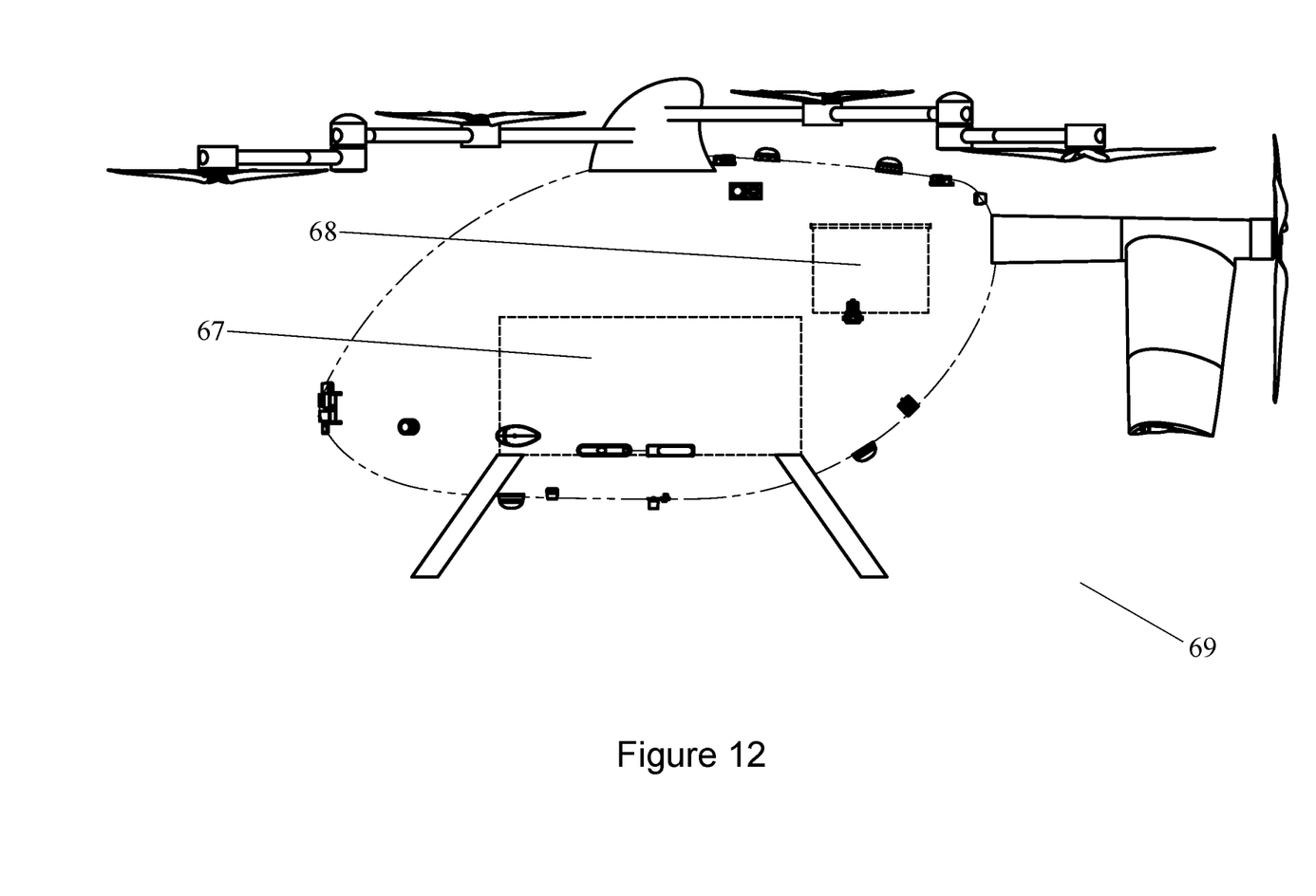
FIG. 12 depicts a side view of an autonomous, electric, VTOL aircraft, such as is depicted by FIG. 1, in accordance with some embodiments of the present disclosure.

In some embodiments, the cargo compartment 67 and the battery compartment 68 may be positioned within the fuselage 10 of the aircraft 69 as depicted by FIG. 12, but other compartment shapes and positions are possible in other embodiments.

As depicted by FIG. 9, in some embodiments, the propellers 1-8 are two-blade propellers whilst the propeller 9 is a three-blade propeller, but in other embodiments, other propeller types may be used.

The aircraft 69 in accordance with some embodiments of the present disclosure may be equipped with emergency landing modules (not shown in the accompanying drawings) that enable the aircraft to identify a safe landing site and perform landing with parachutes and/or airbags when necessary.

As depicted by FIGS. 1-5, the aircraft 69 may be equipped with a plurality of lighting devices in order to comply with safety measures, which in some embodiments, these lighting devices may include navigation/strobe lights 16, 17, navigation/position/strobe lights 26, 27, beacon lights 19, 42, strobe lights 36, 41, but other lighting devices may be used in other embodiments.

Figure 4:
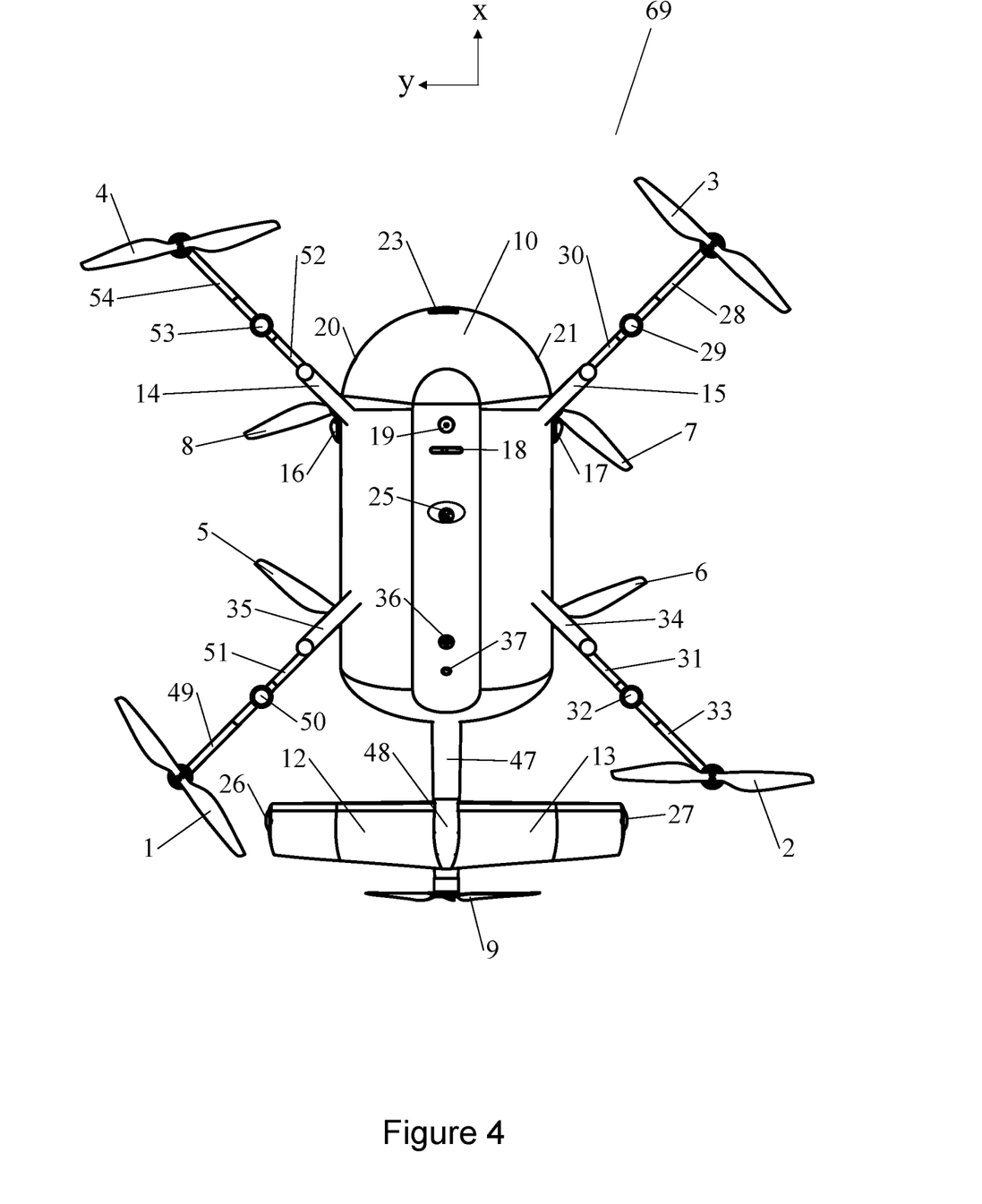
FIG. 4 depicts a bottom view of an autonomous, electric, VTOL aircraft, such as is depicted by FIG. 1.

In some embodiments, the aircraft 69 may be equipped with four shock absorbing landing gears 14, 15, 34, 35 as depicted by FIG. 4, but other forms and types of landing gear may be used in other embodiments.

The foregoing is merely illustrative of the principles of this disclosure and various modifications may be made by those skilled in the art without departing from the scope of this disclosure. The above described embodiments are presented for purposes of illustration and not of limitation. The present disclosure also can take many forms other than those explicitly described herein. Accordingly, it is emphasized that this disclosure is not limited to the explicitly disclosed methods, systems, and apparatuses, but is intended to include variations to and modifications thereof, which are within the spirit of the following claims. For instance, the folding arm-tilting tail configuration is described in various embodiments above in the context of an autonomous, electrically-powered, VTOL aircraft. However, such a folding arm-tilting tail configuration (and other aspects of the aircraft 69 described herein) may be employed with respect to other types of aircraft.

As a further example, variations of apparatus or process parameters (e.g., dimensions, configurations, components, process step order, etc.) may be made to further optimize the provided structures, devices and methods, as shown and described herein. In any event, the structures and devices, as well as the associated methods, described herein have many applications. Therefore, the disclosed subject matter should not be limited to any single embodiment described herein, but rather should be construed in breadth and scope in accordance with the appended claims.

What is claimed is:

1. A vertical takeoff and landing (VTOL) aircraft comprising:
    a fuselage;
    a plurality of arms coupled to the fuselage, each of the plurality of arms including:
        a fixed part;
        a rotating part; and
        a joint connecting the rotating part to the fixed part, the joint comprising an actuator configured to rotate the rotating part relative to the fixed part,
        wherein the fixed part, the joint, and the rotating part are configured such that the rotating part moves in a horizontal plane that does not consist of the fixed part;
    a plurality of propulsion systems mounted on the fixed part and on the rotating part of each one of the plurality of arms, wherein each propulsion system includes a propeller and a motor,
    a tail configured to tilt, comprising:
        a fixed part;
        a tilting part;
        a joint connecting the tilting part to the fixed part, the joint comprising an actuator configured to rotate the tilting part relative to the fixed part;
        a wing coupled to the tilting part;
        one or more propulsion systems mounted on the tilting part, wherein each propulsion system includes a propeller and a motor.

2. The VTOL aircraft of claim 1, wherein the joint of each of the plurality of arms is configured to rotate the arm's rotating part relative to the arm's fixed part between an extended state for forward flight and a compacted state for hover flight.

3. The VTOL aircraft of claim 1, wherein one or more of the plurality of propulsion systems are mounted on the fixed part of each of the plurality of arms, and a same number of propulsion systems are mounted on the rotating part of each of the plurality of arms, and wherein one of the one or more propulsion systems mounted on the rotating part of each of the plurality of arms is mounted on an end of the rotating part that is not connected to the arm's joint.

4. The VTOL aircraft of claim 1, wherein the propulsion systems mounted on each of the plurality of arms are positioned such that for each propulsion system mounted on the rotating part of an arm there is a corresponding propulsion system mounted on that arm's fixed part such that the two propulsion systems are distanced equally from the arm's joint.

5. The VTOL aircraft of claim 4, wherein each two equidistant propulsion systems form a coaxial propulsion system when their corresponding arm's rotating part is in a compacted state for hover flight.

6. The VTOL aircraft of claim 5, wherein motor casings of any two of the propulsion systems forming a coaxial propulsion system include a mating feature.

7. The VTOL aircraft of claim 1, wherein the arms' fixed parts inclined towards a front of the aircraft are in a horizontal plane that is parallel to another horizontal plane consisting the arms' fixed parts inclined towards a rear of the aircraft such that the two horizontal planes do not intersect and are vertically spaced.

8. The VTOL aircraft of claim 1, wherein the joint of the tail is configured to rotate the tail's tilting part relative to the tail's fixed part between an extended state for forward flight wherein the tail's tilting part is horizontal and a compacted state for hover flight wherein the tail's tilting part is vertical.

9. The VTOL aircraft of claim 1, further comprising a controller configured to provide the required control inputs to the actuators of the plurality of arms, and the actuator of the tail, and the motors of the propulsion systems so that (1) the arms rotate simultaneously, (2) the tail tilts in coordination with the arms, and (3) the blade rotation speeds of the propulsion systems are adjusted accordingly; in transition between an extended state for forward flight and a compacted state for hover flight.

10. The VTOL aircraft of claim 9, wherein the controller is capable of rotating the arms' rotating parts selectively to any state other than the extended or compacted states, and wherein the controller is capable of rotating the tail's rotating part to any state other than the extended or compacted states.

11. The VTOL aircraft of claim 1, wherein the aircraft is autonomous.

12. The VTOL aircraft of claim 1, wherein the motors of the propulsion systems are electrically-powered.

* * * * *